(12) United States Patent
Rhodes et al.

(10) Patent No.: US 12,450,885 B2
(45) Date of Patent: Oct. 21, 2025

(54) METHODS AND SYSTEMS FOR INSPECTING COMPONENTS

(71) Applicant: The Boeing Company, Chicago, IL (US)

(72) Inventors: Peter G. Rhodes, Berkeley, MO (US); Eric L. Nicks, Berkeley, MO (US); Liessman E. Sturlaugson, Berkeley, MO (US); Ali K. Babool, Chicago, IL (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 17/814,109

(22) Filed: Jul. 21, 2022

(65) Prior Publication Data

US 2024/0029414 A1   Jan. 25, 2024

(51) Int. Cl.

| | |
|---|---|
| *G06V 10/774* | (2022.01) |
| *B64F 5/60* | (2017.01) |
| *G06T 7/00* | (2017.01) |
| *G06T 9/00* | (2006.01) |
| *G06V 10/764* | (2022.01) |
| *G06V 10/77* | (2022.01) |
| *G06V 10/776* | (2022.01) |

(52) U.S. Cl.
CPC ........ *G06V 10/7747* (2022.01); *G06T 7/0004* (2013.01); *G06T 9/00* (2013.01);
(Continued)

(58) Field of Classification Search
CPC .......... G06V 10/7747; G06V 10/7715; G06V 10/776; G06V 10/764; G06V 10/811;
(Continued)

(56) References Cited

U.S. PATENT DOCUMENTS

| | | |
|---|---|---|
| 10,380,278 B2 | 8/2019 | Thompson et al. |
| 2016/0044322 A1* | 2/2016 | Hochberg ............... G06F 21/79 |
| | | 382/232 |

(Continued)

OTHER PUBLICATIONS

K.S. Williams and R.J. Thompson, "Galvanic Corrosion Risk Mapping." Corrosion, 75 (2019): 474-483.

(Continued)

*Primary Examiner* — Stephen R Koziol
*Assistant Examiner* — Joshua Chen
(74) *Attorney, Agent, or Firm* — Harrity & Harrity, LLP

(57) ABSTRACT

A method includes training a model to identify anomalous portions of a test component using training images and labels that indicate anomalous portions of training components within the training images. The method also includes compressing a source image of the test component to generate a first input image having a first resolution and making a first determination of whether the first input image indicates that the test component is anomalous. The method also includes making a second determination, for each section of a second input image, of whether the section indicates that the test component is anomalous. The second input image has a second resolution that is greater than the first resolution. The method also includes providing an indication of whether the first input image indicates that the test component is anomalous and providing an indication of whether the second input image indicates that the test component is anomalous.

20 Claims, 12 Drawing Sheets

(52) U.S. Cl.
CPC ........ *G06V 10/7715* (2022.01); *G06V 10/776* (2022.01); *B64F 5/60* (2017.01); *G06T 2207/20016* (2013.01); *G06T 2207/30164* (2013.01)

(58) Field of Classification Search
CPC ............... G06T 7/0004; G06T 9/00; G06T 2207/20016; G06T 2207/30164; G06T 7/001; B64F 5/60; G06F 18/2433
See application file for complete search history.

(56) References Cited

U.S. PATENT DOCUMENTS

| | | | | |
|---|---|---|---|---|
| 2018/0232883 | A1* | 8/2018 | Sethi | ...................... G16H 30/40 |
| 2018/0247193 | A1* | 8/2018 | Holtham | ................ H04N 19/60 |
| 2020/0090028 | A1* | 3/2020 | Huang | ............. G06V 30/19173 |
| 2020/0160975 | A1* | 5/2020 | Yao | ......................... G16H 40/20 |
| 2020/0175672 | A1* | 6/2020 | Tanaka | .................. G06T 7/0004 |
| 2020/0294220 | A1* | 9/2020 | Gonzalez Diaz | ......... G06T 7/70 |
| 2022/0383128 | A1* | 12/2022 | Gonzales | ............. G06V 10/764 |

OTHER PUBLICATIONS

K.S. Williams and R.J. Thompson, "Characterizing and Modeling the Corrosion Severity of Microclimates using Signal Processing Techniques." Presented at 2019 DoD—Allied Nations Technical Corrosion Conference, Aug. 12-15, 2019, Oklahoma City, Oklahoma, USA.

* cited by examiner

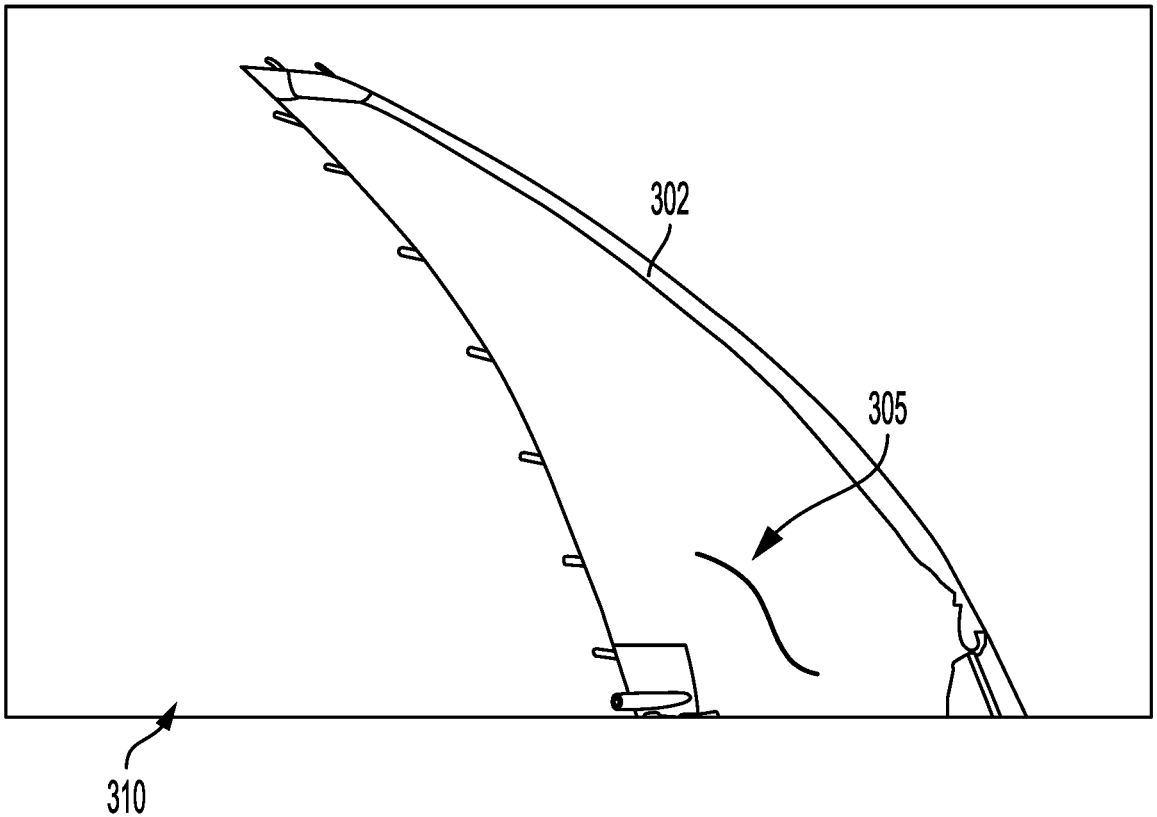
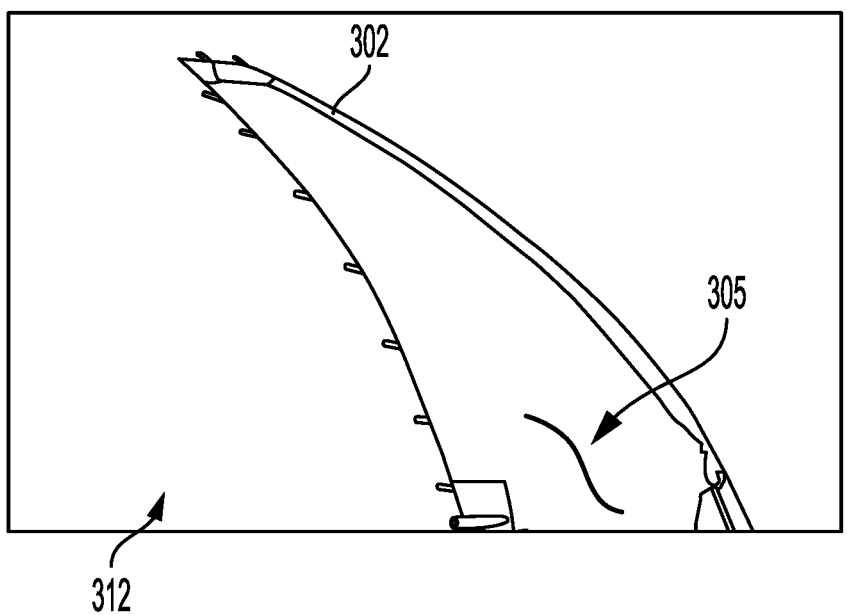
FIG. 4

CALCULATING, VIA THE COMPUTATIONAL MODEL, A CONFIDENCE LEVEL THAT THE FIRST INPUT IMAGE INDICATES THAT THE TEST COMPONENT IS ANOMALOUS

CALCULATING, VIA THE COMPUTATIONAL MODEL, SECOND CONFIDENCE LEVELS THAT CORRESPONDING SECTIONS OF THE PLURALITY OF SECTIONS OF THE SECOND INPUT IMAGE INDICATE THAT THE TEST COMPONENT IS ANOMALOUS

MAKING A PREDICTION REGARDING THE TEST COMPONENT BECOMING ANOMALOUS BASED ON THE FIRST CONFIDENCE LEVEL AND THE SECOND CONFIDENCE LEVELS

218

PROVIDING THE PREDICTION VIA THE USER INTERFACE

```
┌─────────────────────────────────────────────────────────┐
│ DETERMINING, VIA THE COMPUTATIONAL MODEL AND FOR EACH   │
│   SECTION OF A PLURALITY OF SECTIONS OF A THIRD INPUT   │
│   IMAGE, WHETHER THE SECTION OF THE THIRD INPUT IMAGE   │
│     INDICATES THAT THE TEST COMPONENT IS ANOMALOUS,     │
│   WHEREIN THE THIRD INPUT IMAGE HAS A THIRD RESOLUTION  │
│       THAT IS GREATER THAN THE SECOND RESOLUTION        │
└─────────────────────────────────────────────────────────┘
  222┘                        │
                              ▼
┌─────────────────────────────────────────────────────────┐
│  PROVIDING, VIA THE USER INTERFACE, A THIRD INDICATION OF│
│  WHETHER THE THIRD INPUT IMAGE INDICATES THAT THE TEST  │
│                   COMPONENT IS ANOMALOUS                │
└─────────────────────────────────────────────────────────┘
  224┘                                              ↖
                                                     265
                        FIG. 11
```

```
┌─────────────────────────────────────────────────────────┐
│  CALCULATING, VIA THE COMPUTATIONAL MODEL, CONFIDENCE   │
│ LEVELS THAT CORRESPONDING SECTIONS OF THE PLURALITY OF  │
│ SECTIONS OF THE THIRD INPUT IMAGE INDICATE THAT THE TEST│
│                   COMPONENT IS ANOMALOUS                │
└─────────────────────────────────────────────────────────┘
  226┘                                              ↖
                                                     270
                        FIG. 12
```

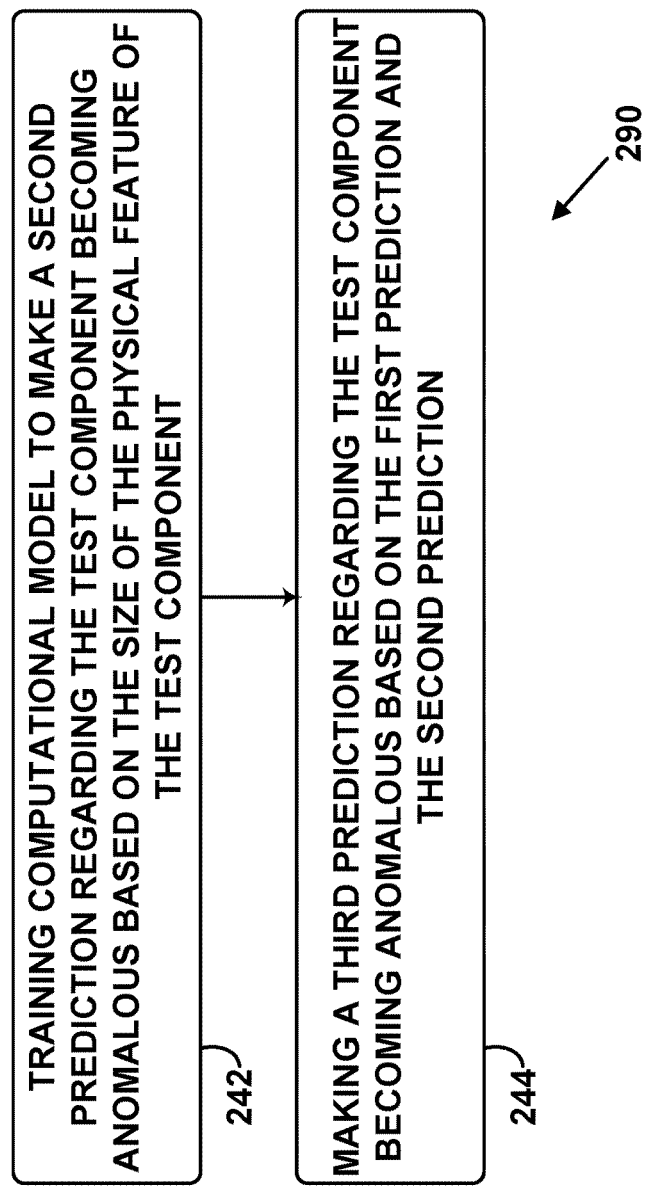

METHODS AND SYSTEMS FOR INSPECTING COMPONENTS

FIELD

The present disclosure generally relates to methods and systems for inspecting components, and more specifically to methods and systems for inspecting components using a computational model.

BACKGROUND

Current methods for identifying anomalous (e.g., damaged) areas of aircraft surfaces can be tedious and can require the use of heavy equipment. For example, a technician might use a scissor lift and a camera to capture images of the aircraft surfaces for later inspection. Aerial drones equipped with cameras can be used to more easily put the camera in the positions required to obtain the desired images, but such methods may still be reliant on a human operator manually identifying anomalous areas of the aircraft. Thus, human error can cause false negatives or false positives when identifying anomalous areas of the aircraft. As such, a need exists for systems and methods that are easier to implement and that can assist a human operator in identifying anomalous areas of the aircraft.

SUMMARY

One aspect of the disclosure is a method for inspecting a component, the method comprising: training a computational model to identify anomalous portions of a test component using training images and labels that indicate anomalous portions of training components within the training images; compressing a source image of the test component to generate a first input image having a first resolution; making a first determination, via the computational model, of whether the first input image indicates that the test component is anomalous; making a second determination, via the computational model and for each section of a plurality of sections of a second input image, of whether the section indicates that the test component is anomalous, wherein the second input image has a second resolution that is greater than the first resolution; providing, via a user interface, a first indication of whether the first input image indicates that the test component is anomalous; and providing, via the user interface, a second indication of whether the second input image indicates that the test component is anomalous.

Another aspect of the disclosure is a non-transitory computer readable medium storing instructions that, when executed by a computing device, cause the computing device to perform functions for inspecting a test component, the functions comprising: training a computational model to identify anomalous portions of a test component using training images and labels that indicate anomalous portions of training components within the training images; compressing a source image of the test component to generate a first input image having a first resolution; making a first determination, via the computational model, of whether the first input image indicates that the test component is anomalous; making a second determination, via the computational model and for each section of a plurality of sections of a second input image, of whether the section indicates that the test component is anomalous, wherein the second input image has a second resolution that is greater than the first resolution; providing, via a user interface, a first indication of whether the first input image indicates that the test component is anomalous; and providing, via the user interface, a second indication of whether the second input image indicates that the test component is anomalous.

Another aspect of the disclosure is a computing device comprising: one or more processors; a user interface; and a computer readable medium storing instructions that, when executed by the one or more processors, cause the computing device to perform functions for inspecting a test component, the functions comprising: training a computational model to identify anomalous portions of a test component using training images and labels that indicate anomalous portions of training components within the training images; compressing a source image of the test component to generate a first input image having a first resolution; making a first determination, via the computational model, of whether the first input image indicates that the test component is anomalous; making a second determination, via the computational model and for each section of a plurality of sections of a second input image, of whether the section indicates that the test component is anomalous, wherein the second input image has a second resolution that is greater than the first resolution; providing, via the user interface, a first indication of whether the first input image indicates that the test component is anomalous; and providing, via the user interface, a second indication of whether the second input image indicates that the test component is anomalous.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 4 shows a source image and an input image, according to an example.

FIG. 8 is a block diagram of a method, according to an example.

FIG. 9 is a block diagram of a method, according to an example.

FIG. 10 is a block diagram of a method, according to an example.

FIG. 11 is a block diagram of a method, according to an example.

FIG. 12 is a block diagram of a method, according to an example.

FIG. 16 is a block diagram of a method, according to an example.

DETAILED DESCRIPTION

As noted above, a need exists for systems and methods that are easier to implement and that can assist a human operator in identifying anomalous areas of manufactured components such as aircraft components. As such, a method includes training a computational model (e.g., a convolutional neural network) to identify anomalous portions of a test component (e.g., an aircraft wing surface) using training images and labels that indicate anomalous portions of training components within the training images. The method also includes compressing a source image of the test component to generate a first input image having a first resolution and making a first determination, via the computational model, of whether the first input image indicates that the test component is anomalous. The method also includes making a second determination, via the computational model and for each section of a plurality of sections of a second input image, of whether the section indicates that the test component is anomalous. The second input image has a second resolution that is greater than the first resolution. The method also includes providing, via a user interface, a first indication of whether the first input image indicates that the test component is anomalous and providing, via the user interface, a second indication of whether the second input image indicates that the test component is anomalous.

By using a computational model to augment the human operator's judgment and/or attention to detail, anomalies within the aircraft surfaces can be identified more accurately. In particular, the computational model is robust in part because it is trained with labeled images having varying degrees of detail, and because it uses images having varying degrees of detail to identify anomalies within the aircraft surfaces. Outputs of the computational model can also be used to generate predictions of whether new anomalies will develop or how quickly existing and new anomalies will propagate into or across such aircraft surfaces.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1:
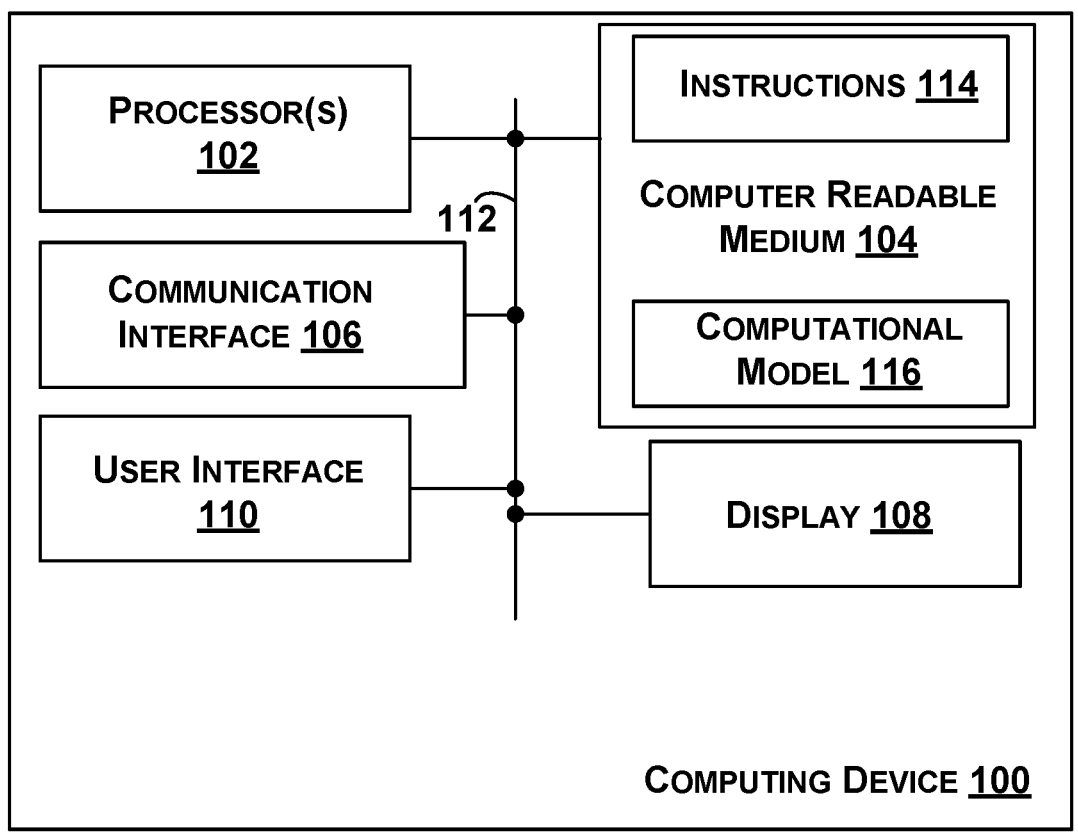
FIG. 1 is block diagram of a computing device, according to an example.

FIG. 1 is a block diagram of a computing device 100. The computing device 100 includes one or more processors 102, a non-transitory computer readable medium 104, a communication interface 106, a display 108, and a user interface 110. Components of the computing device 100 are linked together by a system bus, network, or other connection mechanism 112.

The one or more processors 102 can be any type of processor(s), such as a microprocessor, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 stores instructions 114. The instructions 114 are executable by the one or more processors 102 to cause the computing device 100 to perform any of the functions or methods described herein.

The non-transitory computer readable medium 104 also stores a computational model 116. The computational model 116 can take the form of a convolutional neural network or any other artificial neural network, for example.

The communication interface 106 can include hardware to enable communication within the computing device 100 and/or between the computing device 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices.

The display 108 can be any type of display component configured to display data. As one example, the display 108 can include a touchscreen display. As another example, the display 108 can include a flat-panel display, such as a liquid-crystal display (LCD) or a light-emitting diode (LED) display. Additionally or alternatively, the display 108 includes a virtual reality display, an extended reality display, and/or an augmented reality display.

The user interface 110 can include one or more pieces of hardware used to provide data and control signals to the computing device 100. For instance, the user interface 110 can include a mouse or a pointing device, a keyboard or a keypad, a microphone, a touchpad, or a touchscreen, among other possible types of user input devices. Generally, the user interface 110 can enable an operator to interact with a graphical user interface (GUI) provided by the computing device 100 (e.g., displayed by the display 108).

Figure 2:
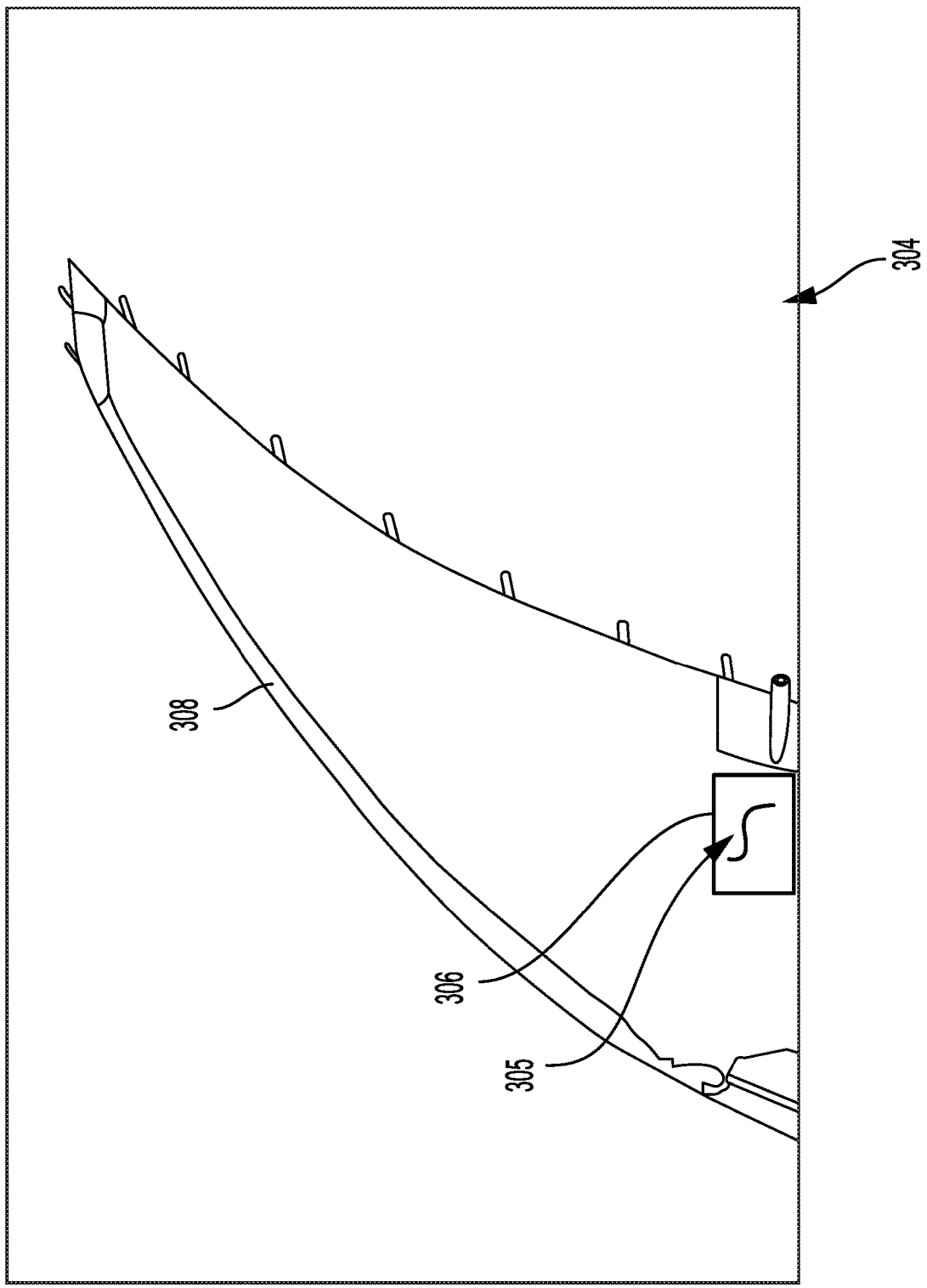
FIG. 2 is a training image showing a training component, according to an example.

FIG. 2 is a training image 304 showing a training component 308. In this example, the training component 308 is a wing of a commercial airliner. The training image 304 is captured using a camera fitted to an aerial drone and/or compressed or otherwise processed. The training image 304 shows a label 306 that indicates the presence of an anomalous portion 305 of the training component 308. The label 306 can take the form of metadata that indicates which pixels of the training image 304 represent the anomalous portion 305. The anomalous portion 305 typically includes one or more of structural damage, delamination, a foreign object or a foreign material, or cosmetic abnormalities such as a deviation in paint color.

The computing device 100 trains the computational model 116 to identify anomalous portions 305 of test components (e.g., aircraft surfaces shown in unlabeled images) using the training image 304 and the label 306 that indicates the anomalous portion 305 of the training component 308 within the training image 304. More specifically, the computing device 100 trains the computational model 116 to identify anomalous portions 305 of test components using many (e.g., hundreds or thousands of) training images 304 and many (e.g., hundreds or thousands of) labels 306 that indicate the anomalous portions 305 of the training components 308 within the training images 304. That is, as the computing device 100 processes the training images 304, the computing device 100 adjusts parameters of the computational model 116 such that the computational model 116 more accurately maps the training images 304 to the labels 306 that indicate the anomalous portions 305 of the training components 308 within the training images 304. In other words, the computing device 100 adjusts the parameters of the computational model 116 such that the computational model 116 generates output that more closely matches the labels 306 when provided the training images 304 as input.

Figure 3:
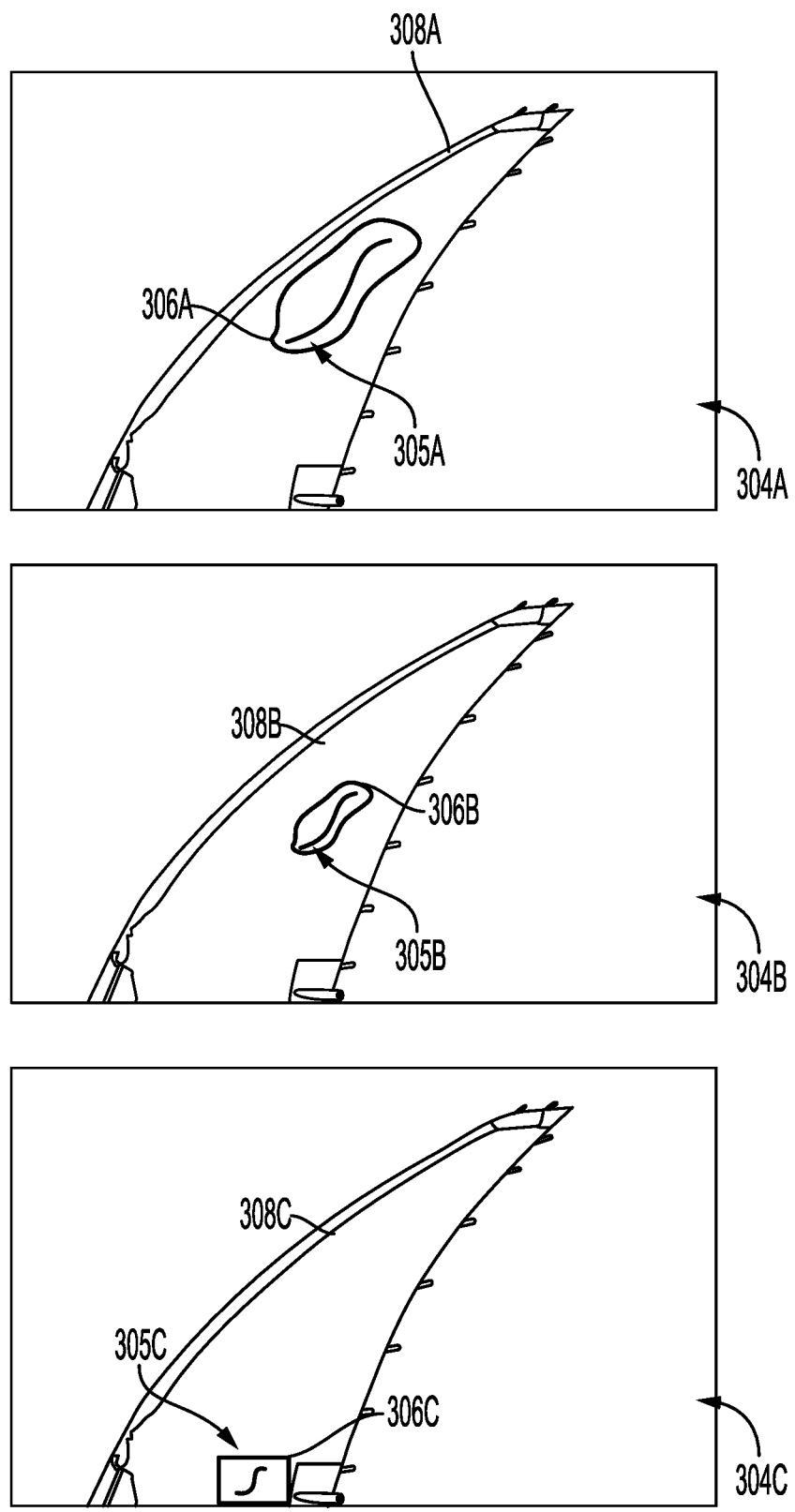
FIG. 3 shows training images, according to an example.

In the example shown in FIG. 3, the computing device 100 trains the computational model 116 using images having two or more different resolutions. As used herein, the "resolution" of an image generally refers to a quantity of pixels included within an image, which can be expressed as a multiplicative product of the width of the image in pixels multiplied by the height of the image in pixels (e.g., 256× 256) or simply as the total quantity of pixels (e.g., 20 megapixels (MP)).

In some examples, the training images 304 include first training images 304A with some of the first training images 304A having corresponding first labels 306A, second training images 304B with some of the second training images 304B having corresponding second labels 306B, and/or third training images 304C with some of the third training images 304C having corresponding third labels 306C. The first training images 304A have a first resolution, the second training images 304B have a second resolution that is greater than the first resolution (e.g., four times greater than the first resolution), and the third training images 304C have a third resolution that is greater than the second resolution (e.g., 305 times greater than the first resolution). For the ease of illustration, the first training image 304A, the second training image 304B, and the third training image 304C have the same size in FIG. 3.

The computing device 100 trains the computational model 116 using the first labels 306A and corresponding first training images 304A having the first resolution (e.g., low resolution), the second labels 306B and corresponding second training images 304B having the second resolution (e.g., medium resolution), and the third labels 306C and the corresponding third training images 304C having the third resolution (e.g., high resolution).

More specifically, the computing device 100 training the computational model 116 can include the computing device 100 adjusting first parameters (e.g., coefficients or weights) of a first function of the computational model 116 such that the first function more accurately maps the first training images 304A to the first labels 306A. For example, the computing device 100 iteratively adjusts the first parameters after processing each of the first training images 304A. Typically, adjustments to the first parameters will be more pronounced early in the training process and become less pronounced after the computing device 100 has trained the first function with many first training images 304A. In this way, the computational model 116 is trained to recognize low resolution images showing test components exhibiting an anomaly (e.g. a large anomaly) and also low resolution images showing test components that do not exhibit an anomaly. In this disclosure, "low resolution" generally means the first resolution discussed above.

Additionally, the computing device 100 trains a second function of the computational model 116 using the second training images 304B. The second function maps the second training images 304B to the second labels 306B. Prior to training the second function of the computational model 116 and after training the first function, the computing device 100 can initialize second parameters of the second function to be equal to the first parameters of the first function of the computational model 116. In many situations, this can accelerate the training of the second function. Accordingly, the computing device 100 adjusts the second parameters of the second function of the computational model 116 such that the second function more accurately maps the second training images 304B to the second labels 306B. More specifically, the computing device 100 iteratively adjusts the second parameters after processing each of the second training images 304B. In this way, the computational model 116 is trained to recognize medium resolution images showing test components exhibiting an anomaly (e.g. a medium sized anomaly) and also medium resolution images showing test components that do not exhibit an anomaly. In this disclosure, "medium resolution" generally means the second resolution discussed above.

Similarly, the computing device 100 trains a third function of the computational model 116 using the third training images 304C. The third function maps the third training images 304C to the third labels 306C. Prior to training the third function and after training the first function and the second function, the computing device 100 can initialize third parameters of the third function to be equal to the first parameters of the first function or equal to the second parameters of the second function. In many situations, this can accelerate the training of the third function. Accordingly, the computing device 100 adjusts the third parameters of the third function of the computational model 116 such that the third function more accurately maps the third training images 304C to the third labels 306C. More specifically, the computing device 100 iteratively adjusts the third parameters after processing each of the third training images 304C. In this way, the computational model 116 is trained to recognize high resolution images showing test components exhibiting an anomaly (e.g. a small anomaly) and also high resolution images showing test components that do not exhibit an anomaly. In this disclosure, "high resolution" generally means the third resolution discussed above.

After the computing device 100 has trained the computational model 116, the computational model 116 can process unlabeled images of test components to determine whether the test components exhibit anomalies. Referring to FIG. 4, an aerial drone with an attached camera can be used to capture a source image 310 that includes a test component 302 (e.g., a wing of a commercial airliner). Typically, the source image 310 has a relatively high resolution (e.g., 20 MP). The field of view of the source image 310 typically corresponds to 1 inch along the test component 302 corresponding to at least 40 pixels.

The computing device 100 compresses the source image 310 to generate a first input image 312 having a first resolution (e.g., 256×256 pixels). Compression is performed in part so that the computational model 116 has a smaller computational load that can be performed in a more reasonable amount of time. Additionally, this provides an opportunity for the computational model 116 to examine images of the same test component 302 at different resolutions, which can make the inspection process more robust.

Next, the computing device 100 uses the first function of the computational model 116 to make a first determination of whether the first input image 312 indicates that the test component 302 is anomalous (e.g., includes one or more anomalous portions 305). More particularly, the computing device 100 uses the computational model 116 to calculate a first confidence level that the first input image 312 indicates that the test component 302 is anomalous. As an example, a confidence level of 0 or 0% indicates the highest certainty that the test component 302 does not exhibit an anomaly. In a similar fashion, a confidence level of 1 or 100% indicates the highest certainty that the test component 302 does exhibit an anomaly. In some examples, the computational model 116 identifies multiple potential anomalous portions 305 and the first confidence level is proportional to the number of anomalous portions 305. Generally, the computational model 116 will be defined by a threshold output value and the degree to which an output exceeds or falls short of the threshold output value will correlate with the first confidence level that the first input image 312 does or does not indicate that the test component 302 is anomalous, respectively.

Using FIG. 4 as an example, the computational model 116 identifies the anomalous portion 305 on the test component 302 within the first input image 312 and calculates a 75% confidence level that the first input image 312 does in fact indicate that the test component 302 is anomalous. The user interface 110 and/or the display 108 then provides a first indication in the form of visual (e.g., textual) or audio information indicating that the first input image 312 does (or in other cases does not) indicate that the test component 302 is anomalous. In some examples, the visual or audio information can also indicate the first confidence level that the test component 302 is or is not anomalous. For instance, the user interface 110 and/or the display 108 can display the first input image 312 and include a visual indication of the location of the anomalous portion 305, as shown in FIG. 4.

Figure 5:
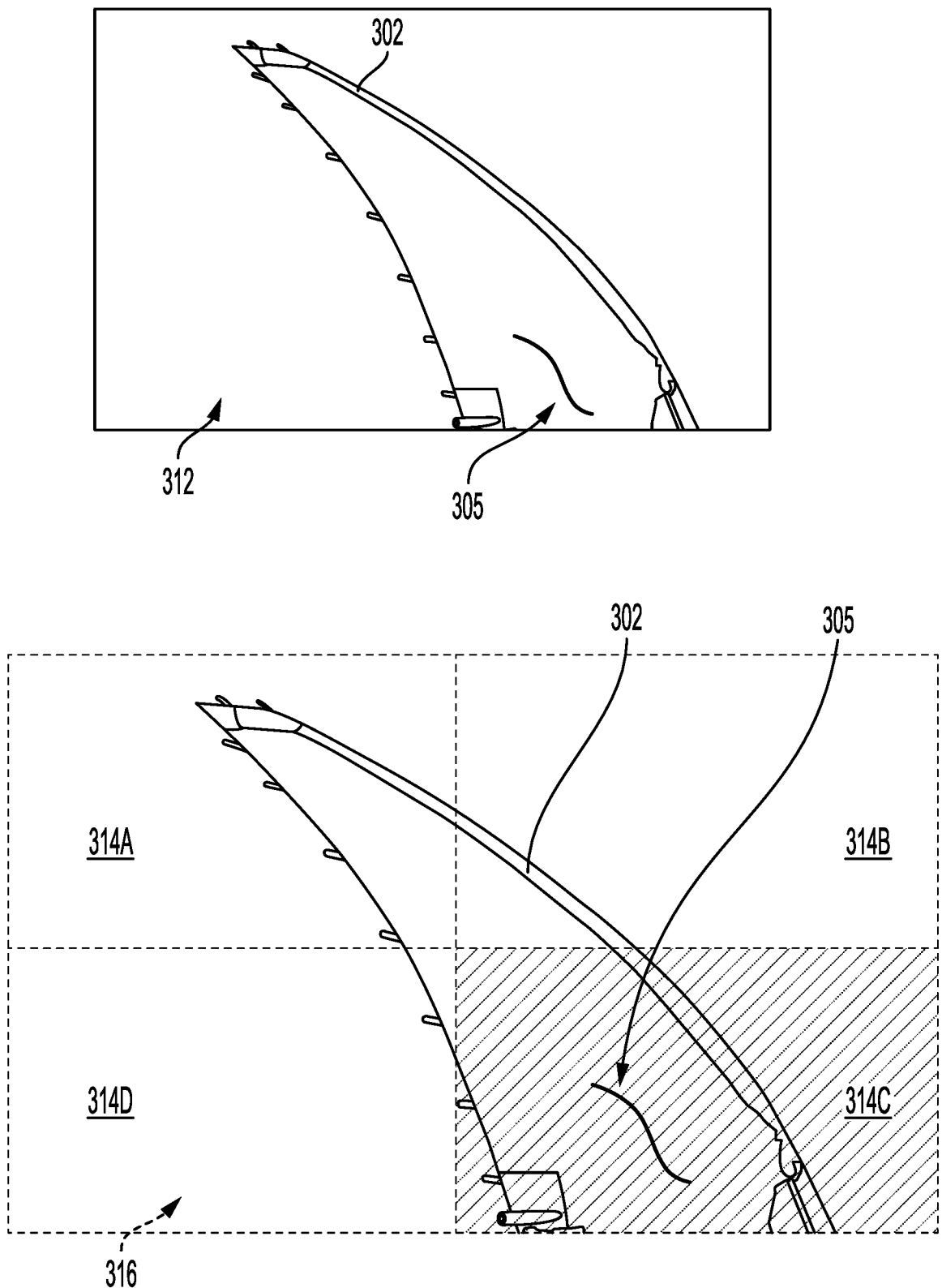
FIG. 5 shows input images, according to an example.

FIG. 5 shows the first input image 312 and a second input image 316. Generally, the computing device 100 compresses the source image 310 to generate the second input image 316 having the second resolution that is greater (e.g., four times greater) than the first resolution of the first input image 312. The second input image 316 includes a section 314A, a section 314B, a section 314C, and a section 314D. In some examples, the source image 310 is cropped into sections which are compressed individually to form the sections 314A-D. In other examples, the second input image 316 could be the same as the source image 310.

The computing device 100 uses the second function of the computational model 116 to make a second determination, for each section of a plurality of sections of the second input image 316, of whether each section indicates that the test component 302 is anomalous. For example, the computing device 100 uses the second function to determine that the section 314A of the second input image 316 does not indicate that that the test component 302 is anomalous, uses the second function to determine that the section 314B does not indicate that that the test component 302 is anomalous, uses the second function to determine that the section 314C does indicate that that the test component 302 is anomalous, and uses the second function to determine that the section 314D does not indicate that that the test component 302 is anomalous. Typically, the sections 314A, 314B, 314C, and 314D each have a resolution that is equal to the first resolution of the first input image 312.

In addition, the computing device 100 uses the second function of the computational model 116 to calculate second confidence levels that corresponding sections 314A-D of the second input image 316 indicate that the test component 302 is anomalous.

The user interface 110 and/or the display 108 then provides a second indication in the form of visual (e.g., textual) or audio information indicating that the second input image 316 does (or in other cases does not) indicate that the test component 302 is anomalous. In some examples, the visual or audio information can also indicate the second confidence levels, as indicated by the sections 314A, 314B, 314C, and 314D.

The user interface 110 and/or the display 108 can also indicate which sections of the sections 314A, 314B, 314C, and 314D of the second input image 316 indicate that the test component is anomalous. For example, the hatching within the section 314C indicates that the section 314C indicates that the test component 302 is anomalous and the lack of hatching within the section 314A, the section 314B, and the section 314D indicates that the section 314A, the section 314B, and the section 314D each do not indicate that the test component 302 is anomalous.

Figure 6:
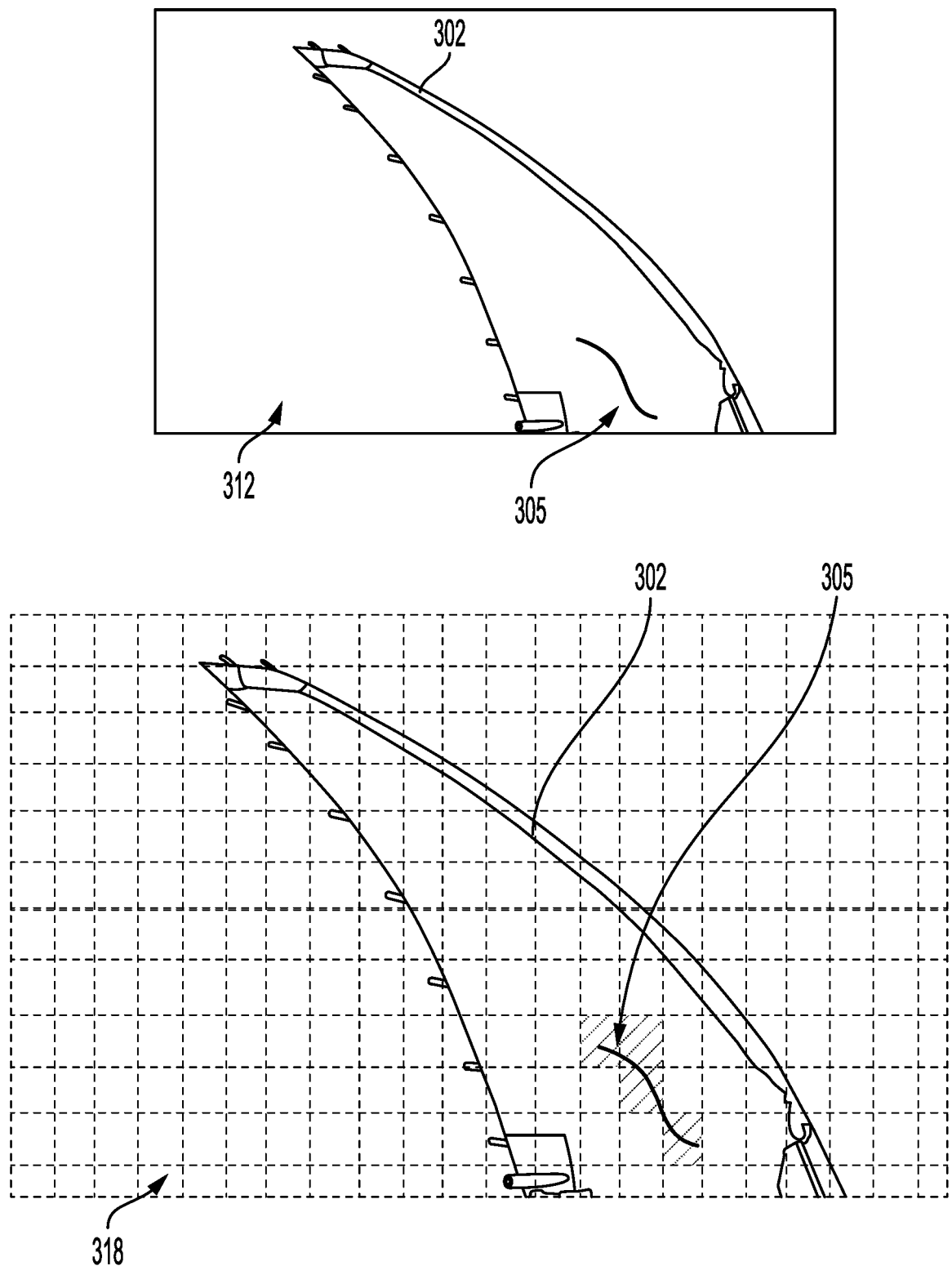
FIG. 6 shows input images, according to an example.

FIG. 6 shows the first input image 312 and a third input image 318. Generally, the computing device 100 compresses the source image 310 to generate the third input image 318 having the third resolution that is greater (e.g., 305 times greater) than the first resolution of the first input image 312. In some examples, the source image 310 is cropped into sections which are compressed individually to form the sections of the third input image 318 shown in FIG. 6. In other examples, the third input image 318 could be the same as the source image 310. The third input image 318 is not to scale in FIG. 6.

The computing device 100 uses the third function of the computational model 116 to make a third determination, for each section of a plurality of sections of the third input image 318, of whether each section indicates that the test component 302 is anomalous. For example, the computing device 100 uses the third function to determine that the unhatched sections of the third input image 318 do not indicate that that the test component 302 is anomalous, and uses the third function to determine that the hatched sections of the third input image 318 do indicate that that the test component 302 is anomalous. Typically, the sections of the third input image 318 each have a resolution that is equal to the first resolution of the first input image 312.

In addition, the computing device 100 uses the third function of the computational model 116 to calculate third confidence levels that corresponding sections of the third input image 318 indicate that the test component 302 is anomalous.

The user interface 110 and/or the display 108 then provides a third indication in the form of visual (e.g., textual) or audio information indicating that the third input image 318 does (or in other cases does not) indicate that the test component 302 is anomalous. In some examples, the visual or audio information can also indicate the third confidence levels. The user interface 110 and/or the display 108 can also indicate (e.g., via display) which sections of the third input image 318 indicate that the test component 302 is anomalous via hatching.

In some examples, the computational model 116 calculates a composite confidence level that represents a weighted average of the first confidence level, the second confidence levels, and/or the third confidence levels. Then the composite confidence level can be provided in audio or visual format via the user interface 110 and/or the display 108. In some examples, the composite confidence level, the first confidence level, the second confidence levels, and/or the third confidence levels are less than 50% and the computational model 116 can predict a future time and/or date at which one or more of the composite confidence level, the first confidence level, the second confidence levels, or the third confidence levels will surpass 50%, which the computational model 116 would interpret as the test component 302 exhibiting an anomalous portion 305. This prediction can be provided in audio or visual format via the user interface 110 and/or the display 108. In another example, the computational model 116 predicts a number of flight hours that will pass before the test component 302 exhibits an anomaly.

In some examples, user input is used to further train and/or correct the computational model 116. For example, the user interface 110 can receive input indicating that the first indication regarding the first input image 312, the second indication regarding the second input image 316, and/or the third indication regarding the third input image 318 is incorrect with respect to a presence of an anomaly or a location of the anomaly on the test component 302. Then, the computing device 100 retrains the computational model 116 using the input. More specifically, the input is used to correct the labels generated by the computational model 116 and those corrected labels and the associated images are used to retrain the computational model 116.

In some examples, the output of the computational model 116 can be used to predict the future appearance of anomalies and/or the locations of the future anomalies on components. For example, the computing device 100 determines a size of a physical feature of the test component 302 based on the second determination and/or the third determination. More specifically, the computing device 100 counts a number of sections of the second input image 316 (see FIG. 5) and/or the number of sections of the third input image 318 (see FIG. 6) that correspond to the physical feature as a proxy for the size of the physical feature. Then, the computing device 100 uses a physical model to make a prediction regarding the test component 302 becoming anomalous (e.g., having a greater than 50% confidence that the physical feature is anomalous) based on the current size of the physical feature of the test component 302. For example, the physical feature can be suspected corrosion and the potential growth of the physical feature can be modeled using an equation similar to the Deal-Grove model or other equations based on physical laws. The user interface 110 and/or the display 108 can provide the prediction in a visual or audio manner.

Additionally, the computational model 116 can be trained to make a prediction that augments the prediction of the physical model. For example, the computing device 100 trains the computational model 116 to make a second prediction regarding the test component 302 becoming anomalous based on the current size of the physical feature of the test component 302. For example, the training data could include many image sets each including a series of images of the same physical feature taken over time. The computing device 100 can train the computational model 116 using the training data to forecast the growth of physical features on test components 302 that could develop into anomalous portions 305 of the test components 302. Next, the computing device 100 uses the first prediction based on the physical model and the second prediction based on the computational model 116 to make a third prediction regarding the test component becoming anomalous. For example, the computing device 100 predicts a future time and/or date at which the physical feature develops into an anomalous portion 305. In another example, the computing device 100 predicts a number of flight hours that will pass before the test component 302 exhibits the anomalous portion 305. The third prediction could be a weighted average of the first prediction based on the physical model and the second prediction based on the computational model 116, for example.

FIGS. 7-16 are a block diagrams of methods 200, 250, 255, 260, 265, 270, 275, 280, 285, and 290 performed by the computing device 100 for inspecting a component. As shown in FIGS. 7-16, the methods 200, 250, 255, 260, 265, 270, 275, 280, 285, and 290 include one or more operations, functions, or actions as illustrated by blocks 202, 204, 206, 208, 210, 212, 214, 216, 218, 220, 222, 224, 226, 228, 230, 232, 234, 236, 238, 240, 242, and 244. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Figure 7:
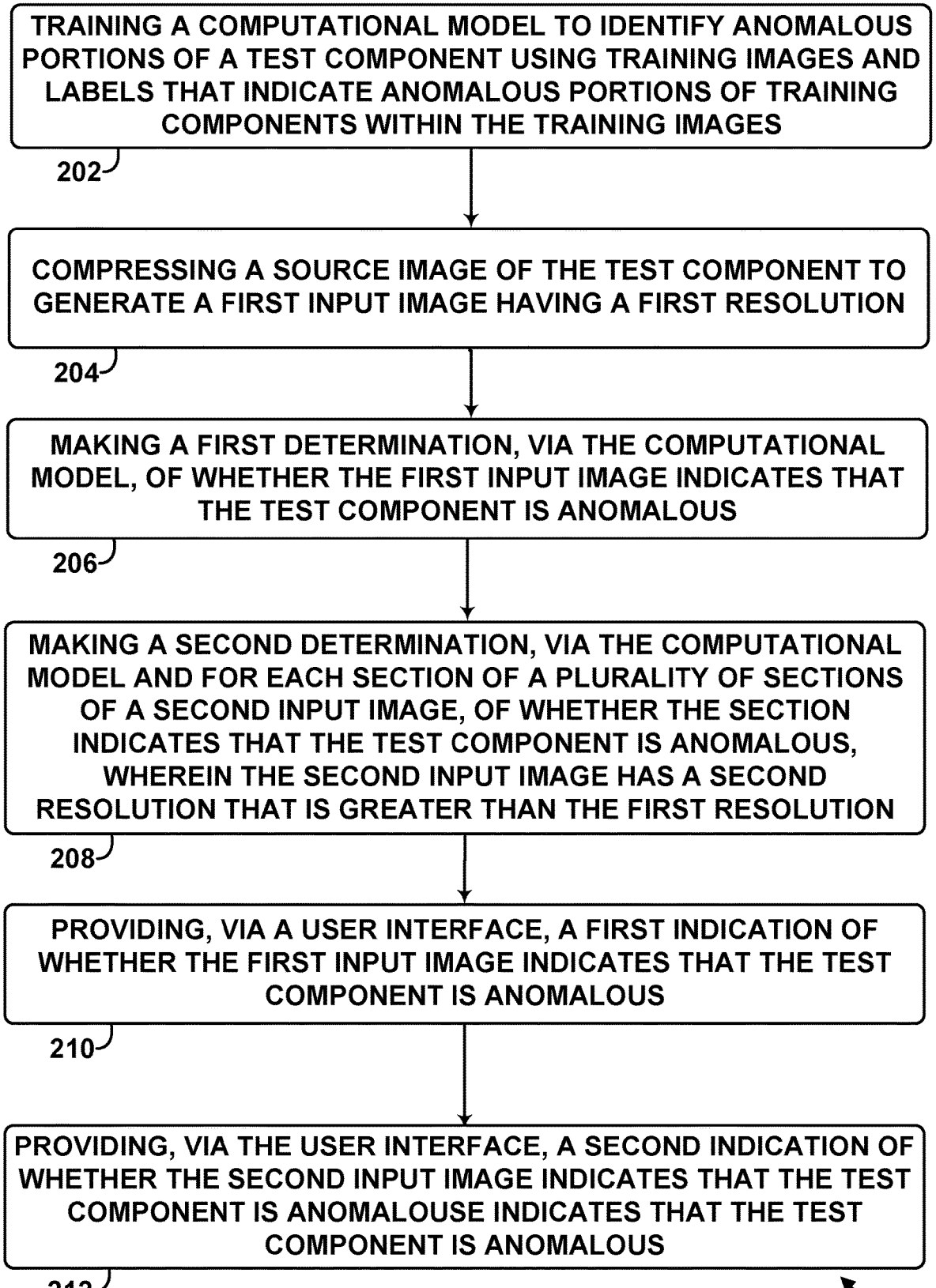
FIG. 7 is a block diagram of a method, according to an example.

FIG. 7 is a block diagram of the method 200.

At block 202, the method 200 includes training the computational model 116 to identify the anomalous portions 305 of the test component 302 using the training images 304 and the labels 306 that indicate the anomalous portions 305 of the training components 308 within the training images 304. This functionality is described above with reference to FIG. 2 and FIG. 3.

At block 204, the method 200 includes compressing the source image 310 of the test component 302 to generate the first input image 312 having the first resolution. This functionality is described above with reference to FIG. 4.

At block 206, the method 200 includes making the first determination, via the computational model 116, of whether the first input image 312 indicates that the test component 302 is anomalous. This functionality is described above with reference to FIG. 4.

At block 208, the method 200 includes making the second determination, via the computational model 116 and for each section 314 of the plurality of sections 314 of the second input image 316, of whether the section 314 indicates that the test component 302 is anomalous. The second input image 316 has the second resolution that is greater than the first resolution. This functionality is described above with reference to FIG. 5.

At block 210, the method 200 includes providing, via the user interface 110, the first indication of whether the first input image 312 indicates that the test component 302 is anomalous. This functionality is described above with reference to FIG. 4.

At block 212, the method 200 includes providing, via the user interface 110, the second indication of whether the second input image 316 indicates that the test component 302 is anomalous. This functionality is described above with reference to FIG. 5.

FIG. 8 is a block diagram of the method 250.

At block 214, the method 250 includes calculating, via the computational model 116, the first confidence level that the first input image 312 indicates that the test component 302 is anomalous. This functionality is described above with reference to FIG. 4.

FIG. 9 is a block diagram of the method 255.

At block 216, the method 255 includes calculating, via the computational model 116, the second confidence levels that corresponding sections of the plurality of sections of the second input image 316 indicate that the test component 302 is anomalous. This functionality is described above with reference to FIG. 5.

FIG. 10 is a block diagram of the method 260.

At block 218, the method 260 includes making the prediction regarding the test component 302 becoming anomalous based on the first confidence level and the second confidence levels. This functionality is described above with reference to FIG. 5.

At block 220, the method 260 includes providing the prediction via the user interface 110. This functionality is described above with reference to FIG. 5.

FIG. 11 is a block diagram of the method 265.

At block 222, the method 265 includes determining, via the computational model 116 and for each section 314 of the plurality of sections of the third input image 318, whether the section 314 of the third input image 318 indicates that the test component 302 is anomalous. The third input image 318 has the third resolution that is greater than the second resolution. This functionality is described above with reference to FIG. 6.

At block 224, the method 265 includes providing, via the user interface 110, the third indication of whether the third input image 318 indicates that the test component 302 is anomalous. This functionality is described above with reference to FIG. 6.

FIG. 12 is a block diagram of the method 270.

At block 226, the method 270 includes calculating, via the computational model 116, confidence levels that corresponding sections of the plurality of sections of the third input image 318 indicate that the test component 302 is anomalous. This functionality is described above with reference to FIG. 6.

Figure 13:
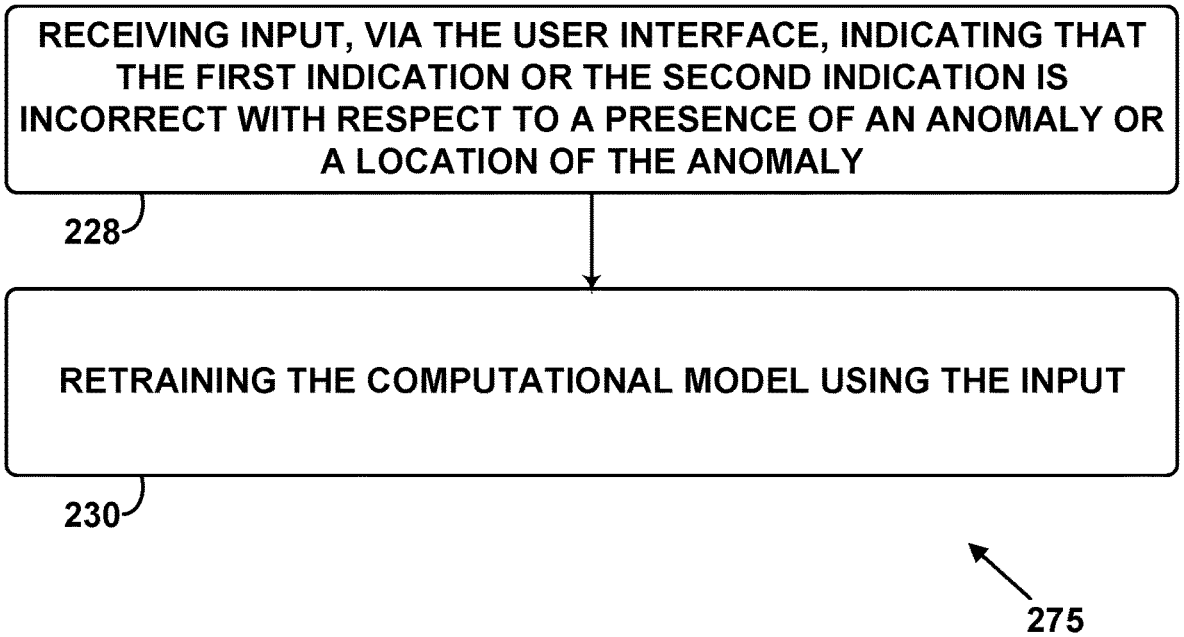
FIG. 13 is a block diagram of a method, according to an example.

FIG. 13 is a block diagram of the method 275.

At block 228, the method 275 includes receiving input, via the user interface 110, indicating that the first indication or the second indication is incorrect with respect to a presence of an anomaly or a location of the anomaly. This functionality is described above with reference to FIG. 6.

At block 230, the method 275 includes retraining the computational model 116 using the input. This functionality is described above with reference to FIG. 6.

Figure 14:
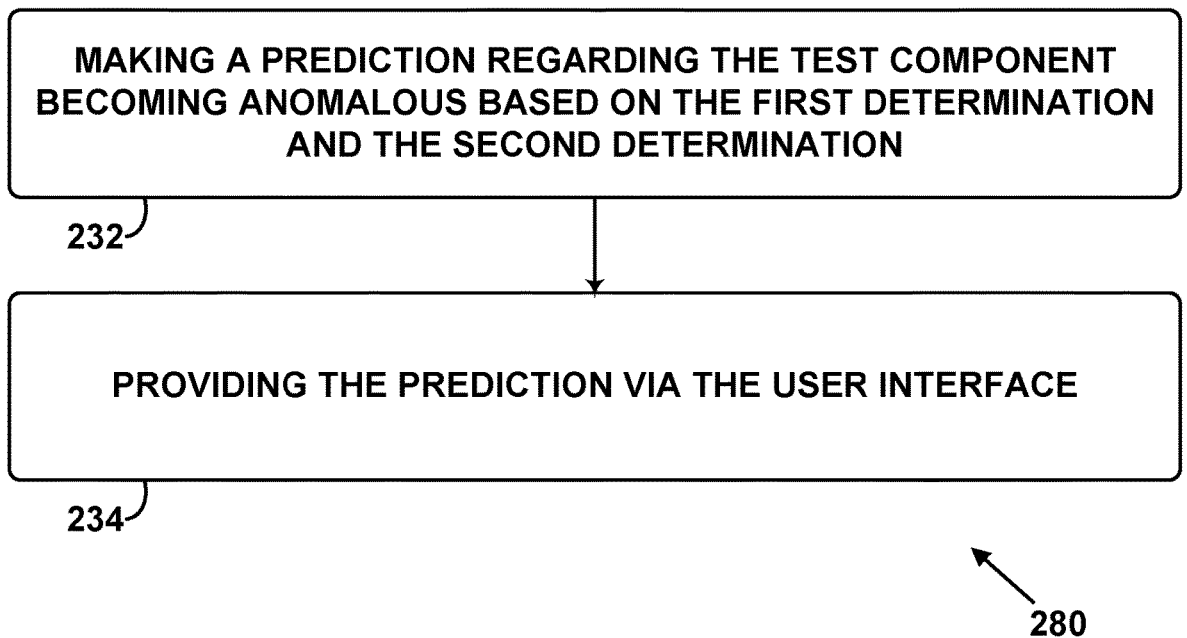
FIG. 14 is a block diagram of a method, according to an example.

FIG. 14 is a block diagram of the method 280.

At block 232, the method 280 includes making the prediction regarding the test component 302 becoming anomalous based on the first determination and the second determination. This functionality is described above with reference to FIG. 6.

At block 234, the method 280 includes providing the prediction via the user interface 110. This functionality is described above with reference to FIG. 6.

Figure 15:
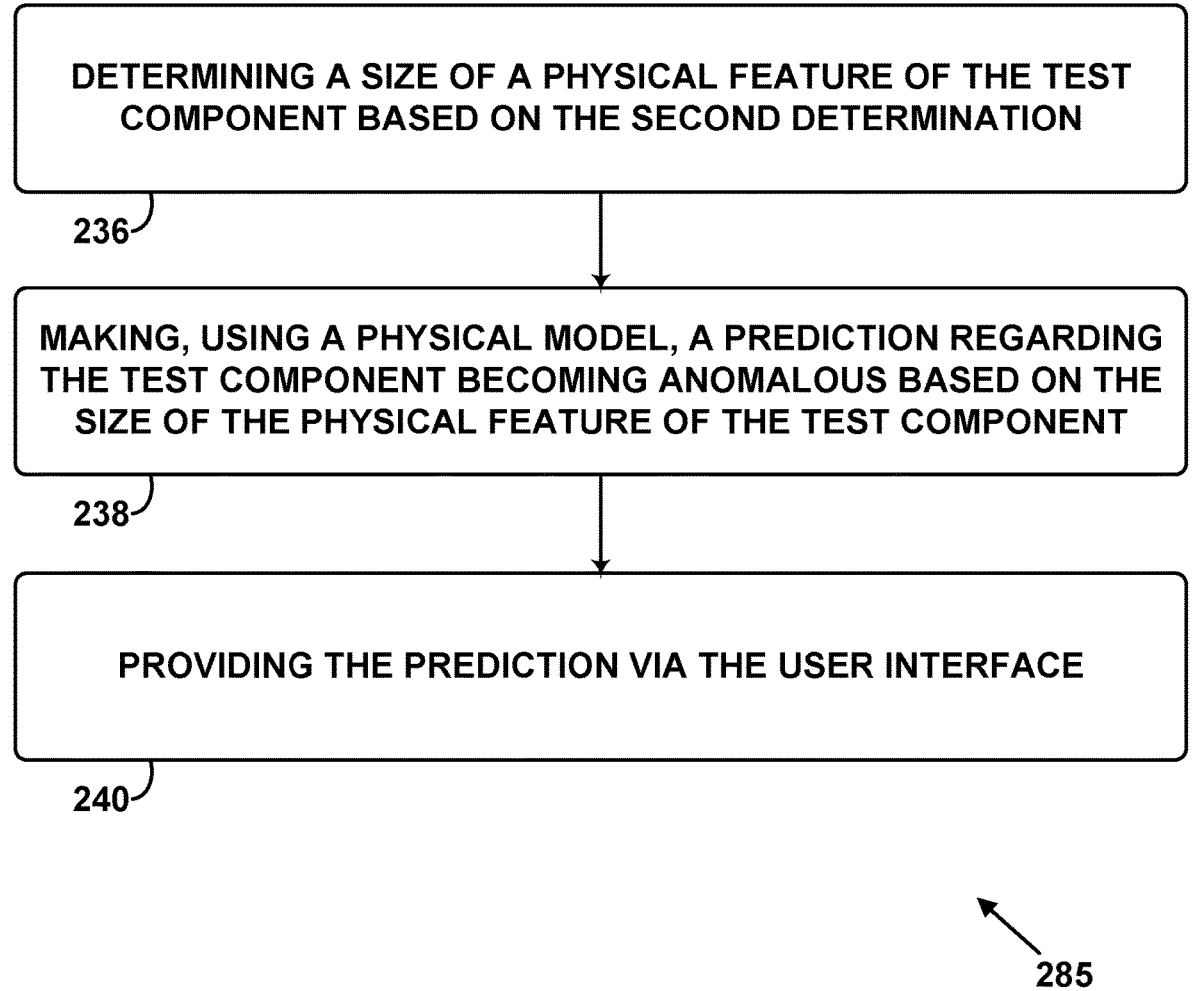
FIG. 15 is a block diagram of a method, according to an example.

FIG. 15 is a block diagram of the method 285.

At block 236, the method 285 includes determining a size of a physical feature of the test component 302 based on the second determination. This functionality is described above with reference to FIG. 6.

At block 238, the method 285 includes making, using a physical model, the first prediction regarding the test component 302 becoming anomalous based on the size of the physical feature of the test component 302. This functionality is described above with reference to FIG. 6.

At block 240, the method 285 includes providing the prediction via the user interface 110. This functionality is described above with reference to FIG. 6.

FIG. 16 is a block diagram of the method 290.

At block 242, the method 290 includes training the computational model 116 to make the second prediction regarding the test component 302 becoming anomalous based on the size of the physical feature of the test component 302. This functionality is described above with reference to FIG. 6.

At block 244, the method 290 includes making the third prediction regarding the test component 302 becoming anomalous based on the first prediction and the second prediction. This functionality is described above with reference to FIG. 6.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method for inspecting a component, the method comprising:
    training a computational model to identify anomalous portions of a test component using training images and labels that indicate anomalous portions of training components within the training images;
    compressing a source image of the test component to generate a first input image having a first resolution;
    making a first determination, via the computational model, of whether the first input image indicates that the test component is anomalous;
    making a second determination, via the computational model and for each section of a plurality of sections of a second input image, of whether a section indicates that the test component is anomalous,
        wherein the second input image has a second resolution that is greater than the first resolution, and
        wherein each section has a resolution that is equal to the first resolution,
            wherein an aspect ratio of each section is preserved when making the second determination, and
            wherein the resolution refers to one or more of:
                a multiplicative product of a width of an image in pixels multiplied by a height of the image in pixels, or
                a total quantity of pixels;
    providing, via a user interface, a first indication of whether the first input image indicates that the test component is anomalous; and
    providing, via the user interface, a second indication of whether the second input image indicates that the test component is anomalous.

2. The method of claim 1, wherein training the computational model to identify anomalous portions of the test component using the training images and the labels comprises training the computational model using the training images and the labels that include first labels and corresponding first training images having the first resolution and second labels and corresponding second training images having the second resolution.

3. The method of claim 2, wherein training the computational model further comprises:
adjusting first parameters of a first function of the computational model such that the first function more accurately maps the first training images to the first labels; and
initializing second parameters of a second function of the computational model to be equal to the first parameters, wherein the second function maps the second training images to the second labels.

4. The method of claim 2, wherein training the computational model further comprises:
adjusting first parameters of a first function of the computational model such that the first function more accurately maps the first training images to the first labels; and
adjusting second parameters of a second function of the computational model such that the second function more accurately maps the second training images to the second labels.

5. The method of claim 4, wherein training the computational model to identify anomalous portions of the test component using the training images and the labels comprises training the computational model using the training images and the labels that include third labels and corresponding third training images having a third resolution that is greater than the second resolution, and wherein training the computational model further comprises:
adjusting third parameters of a third function of the computational model using the corresponding third training images and the third labels such that the third function more accurately maps the corresponding third training images to the third labels.

6. The method of claim 1, further comprising:
calculating, via the computational model, a confidence level that the first input image indicates that the test component is anomalous,
wherein providing the first indication comprises providing the first indication such that the first indication indicates the confidence level.

7. The method of claim 6, wherein the confidence level is a first confidence level, the method further comprising:
calculating, via the computational model, second confidence levels that corresponding sections of the plurality of sections of the second input image indicate that the test component is anomalous,
wherein providing the second indication comprises providing the second indication such that the second indication indicates the second confidence levels.

8. The method of claim 7, further comprising:
making a prediction regarding the test component becoming anomalous based on the first confidence level and the second confidence levels; and
providing the prediction via the user interface.

9. The method of claim 1, wherein providing the second indication comprises providing the second indication such that the second indication also indicates which sections of the plurality of sections of the second input image indicate that the test component is anomalous.

10. The method of claim 1, wherein a resolution of each section of the plurality of sections of the second input image is equal to the first resolution.

11. The method of claim 1, further comprising:
determining, via the computational model and for each section of a plurality of sections of a third input image, whether section of the plurality of sections of the third input image indicates that the test component is anomalous, wherein the third input image has a third resolution that is greater than the second resolution; and
providing, via the user interface, a third indication of whether the third input image indicates that the test component is anomalous.

12. The method of claim 11, wherein providing the third indication comprises providing the third indication such that the third indication also indicates which sections of the plurality of sections of the third input image indicate that the test component is anomalous.

13. The method of claim 11, further comprising:
calculating, via the computational model, confidence levels that corresponding sections of the plurality of sections of the third input image indicate that the test component is anomalous,
wherein providing the third indication comprises providing the third indication such that the third indication indicates the confidence levels.

14. The method of claim 11, wherein a resolution of each section of the plurality of sections of the second input image is equal to a resolution of each section of the plurality of sections of the third input image.

15. The method of claim 1, further comprising:
receiving input, via the user interface, indicating that the first indication or the second indication is incorrect with respect to a presence of an anomaly or a location of the anomaly; and
retraining the computational model using the input.

16. The method of claim 1, further comprising:
making a prediction regarding the test component becoming anomalous at one or more of a future time or a future date based on the first determination and the second determination; and
providing the prediction via the user interface.

17. The method of claim 1, further comprising:
determining a size of a physical feature of the test component based on the second determination;
making, using a physical model, a prediction regarding the test component becoming anomalous based on the size of the physical feature of the test component; and
providing the prediction via the user interface.

18. The method of claim 17, wherein the prediction is a first prediction, the method further comprising:
training the computational model to make a second prediction regarding the test component becoming anomalous based on the size of the physical feature of the test component; and
making a third prediction regarding the test component becoming anomalous based on the first prediction and the second prediction.

19. A non-transitory computer readable medium storing instructions that, when executed by a computing device, cause the computing device to perform functions for inspecting a test component, the functions comprising:
training a computational model to identify anomalous portions of a test component using training images and labels that indicate anomalous portions of training components within the training images;
compressing a source image of the test component to generate a first input image having a first resolution;

making a first determination, via the computational model, of whether the first input image indicates that the test component is anomalous;

making a second determination, via the computational model and for a section, of a plurality of sections, of a second input image, of whether the section indicates that the test component is anomalous,
- wherein the second input image has a second resolution that is greater than the first resolution, and
- wherein each section, of the plurality of sections, has a resolution that is equal to the first resolution,
  - wherein an aspect ratio of each section is preserved when making the second determination;

providing, via a user interface, a first indication of whether the first input image indicates that the test component is anomalous; and providing, via the user interface, a second indication of whether the second input image indicates that the test component is anomalous.

20. A computing device comprising:
one or more processors;
a user interface; and
a computer readable medium storing instructions that, when executed by the one or more processors, cause the computing device to perform functions for inspecting a test component, the functions comprising:

training a computational model to identify anomalous portions of a test component using training images and labels that indicate anomalous portions of training components within the training images;

compressing a source image of the test component to generate a first input image having a first resolution;

making a first determination, via the computational model, of whether the first input image indicates that the test component is anomalous;

making a second determination, via the computational model and for a section, of a plurality of sections, of a second input image, of whether the section indicates that the test component is anomalous,
- wherein the second input image has a second resolution that is greater than the first resolution,
- wherein each section, of the plurality of sections, has a resolution that is equal to the first resolution, and
- wherein an aspect ratio of each section is preserved when making the second determination;

providing, via the user interface, a first indication of whether the first input image indicates that the test component is anomalous; and providing, via the user interface, a second indication of whether the second input image indicates that the test component is anomalous.

* * * * *